United States Patent Office 2,845,403
Patented July 29, 1958

2,845,403

MALEIC ANHYDRIDE MODIFIED BUTYL RUBBER

Paul F. Gunberg, Ridgewood, N. J., assignor to United States Rubber Company, New York, N. Y., a corporation of New Jersey No Drawing. Application June 2, 1954
Serial No. 434,073

8 Claims. (Cl. 260—78.4)

This invention relates to an improved process of making rubbery adducts by chemical reaction of maleic anhydride with Butyl rubber and to the new adducts so formed.

The "Butyl rubbers" are the rubbery copolymers made from a major amount of isobutylene and a minor amount of a conjugated diolefin hydrocarbon in the presence of a Friedel-Crafts type of catalyst. Usually these copolymers are composed of isobutylene and the diolefin in proportions ranging from 75:25 to 98:2, most often 95:5 to 98:2. The diolefin is usually isoprene, but can also be another hydrocarbon containing from 4 to 6 carbon atoms, e. g., butadiene or piperylene.

More particularly, the invention comprises the process of accelerating the reaction between maleic anhydride and Butyl rubber at a temperature of about 135° C., to about 200° C. by means of an organic compound wherein at least one halogen atom is connected to a trivalent nitrogen atom, as exemplified by the N-halogenoamides and N-halogenoimides. The halogen is one whose atomic number is between 16 and 36, that is, it is chlorine or bromine. The reaction is preferably run in an internal type of mixer.

The invention provides the following advantages over the prior art:

(1) The Butyl rubber reacts with maleic anhydride fast enough so that relatively little of the anhydride escapes from an ordinary mixer at 200° C. Thus the invention provides a commercially practical process.

(2) Adducts can be made more rapidly at a much lower temperature, e. g., as low as 135° C., than in the absence of an accelerator. This provides two advantages:

(a) The vapor pressure of the maleic anhydride is much lower (at 136° C. it is 100 mm. Hg, whereas at 202° C. it is 760 mm. Hg);

(b) The adducts can be made commercially in standard equipment. Some of the largest standard internal mixers cannot raise the temperature of a mix to 200° C. without special heating attachments. A temperature of 150–175° C. is easily attainable without such attachments.

Typical accelerators according to my invention are: 1,3-dichloro-5,5-dimethylhydantoin (also called "Dactin" or "Halane"), 3-chloro-5,5-dimethylhydantoin, 3-bromo-5,5 - dimethylhydantoin, 1,3 - dibromo - 5,5 - dimethylhydantoin, N-bromosuccinimide, N-chlorosuccinimide, N-bromophthalimide, N-chlorophthalimide, N,N-dichloro-p-toluenesulfonamide (Dichloramine T), N,N-dichlorobenzene-sulfonamide (Dichloramine B), N-chloro-N-sodio-p-toluenesulfonamide ("Chloramine T"), N-chloro-N-sodio-benzenesulfonamide ("Chloramine B"), benzoquinone chloroimide, benzoquinone bis-chloroimide, 2,6-dibromo-N-chloroquinoneimine and N,2,6-trichloroquinoneimine.

Because of its relatively greater activity, the preferred accelerator is "Dactin."

The amount of accelerator can be varied between about one part (all parts being by weight) and ten parts per 100 parts of the Butyl rubber. When less than one part is used, the acceleration is so slight that the adduct cannot be formed in an internal mixer sufficiently rapidly to prevent loss of most of the maleic anhydride. The use of more than about ten parts is wasteful and does not increase the reaction rate over the rate when less than ten parts is used. Also, some accelerators, e. g., Dactin, act as plasticizers, and lower the plasticity of the adduct so much, when more than ten parts are used, that the adducts are difficult to handle on conventional rubber processing equipment. Accordingly, about three to four parts of Dactin usually give optimum acceleration. The optimum amount of accelerator is dependent on the proportion of N-halogen in the accelerator; i. e., it is directly proportional to the number of such halogen groups in the molecule, and inversely proportional to the atomic weight of the halogen and the molecular weight of the compound. In other words, to achieve the optimum effect with any particular accelerator in the operation of this invention the molar amount of N-halogen is kept substantially constant. An overall preferred range is from about two parts to about nine parts of the accelerator.

The amount of maleic anhydride charged into the internal mixer can be as little as about two parts per 100 parts of the Butyl rubber under optimum conditions; i. e., when the reaction is greatly accelerated and when a reasonably leak-resistant standard mixer is used. However, I generally use more maleic anhydride, e. g., about 3–10 parts, in order to compensate for leakage of maleic anhydride vapor. I can use still larger amounts, e. g., 20 parts, but in such cases most of the maleic anhydride is wasted. The maximum amount of maleic anhydride which can react with the Butyl rubber in the sense of the present invention is roughly on the order of two parts per one part of the diene combined in the Butyl rubber. Any desired internal type of mixer can be used, well-known ones being the Banbury mixer, the Werner-Pfleiderer mixer and the Gordon plasticator. I prefer to use the Banbury.

The temperature at which I carry out my reaction not only can be varied widely, but can be considerably lower than that used to make Butyl adducts without acceleration. For example, in making adducts in an autoclave without an accelerator, it is necessary to use a temperature of about 200° C. and a time of 360 minutes in order to react, say, three parts of maleic anhydride with GRI-15 (prepared from about 98 parts of isobutylene and 2 parts of isoprene according to Rubber Age 74, 561 (1954). I can carry out the process of this invention at a temperature between about 135° C. and about 200° C. I prefer a temperature between about 150° C. and about 180° C.

I can determine the extent of reaction between the rubber and maleic anhydride by analysis of the adduct. However, it is easier to follow the course of the reaction by vulcanizing samples of the adduct with zinc oxide under standardized conditions. The properties of the vulcanizates are then measured on conventional rubber-testing apparatus. The extent of adduct formation has been found to be correlated with the properties of the vulcanizate. An adduct containing less than about one part of combined maleic anhydride, i. e., one made by having less than about two parts of maleic anhydride in the feed, is not vulcanized by zinc oxide to any practical extent.

Perhaps the most important property of my vulcanized adducts is the torsional hysteresis. My new adducts usually form vulcanizates whose torsional hysteresis is low, and is not substantially higher at 138° C. than it is at 20–25° C.

Vulcanized adducts made without acceleration gradually change from elastic materials to partially plastic materials as the temperature is raised, beginning to lose their shape at temperatures above, say, 150° C. Accordingly, these adducts cannot be used in tires which are to be run steadily at high speeds. The change from elastic to plastic condition begins at even lower temperatures than 150° C.

More energy is needed to roll a loaded tire which has become partially plastic than is needed to roll one which is more completely elastic. This difference shows up as a greater build-up of heat in the former tire than in the latter. Thus, a vicious cycle is set up: a tire which is least suited to withstand high temperature runs hotter than a tire which can stand heat better.

I have now found that many of my new adducts can be vulcanized with zinc oxide to form products which remain elastic at higher temperatures than do the corresponding products which are made from the conventionally-made adducts. Therefore, products such as tires made from my new adducts can be used at higher temperatures than can those made from the prior art adducts.

This partial change from elasticity to plasticity is followed experimentally by measuring the torsional hysteresis of the vulcanized material at several temperatures. The lower is this hysteresis value, the more elastic is the material. The prior art adducts form vulcanized materials whose torsional hysteresis is much higher at 138° C. than it is at room temperature (20–25° C.). In contrast, my new adducts form vulcanized materials whose torsional hysteresis is at least substantially as low at 138° C. as at room temperature, and in fact often is much lower at the higher temperature than at room temperature. Furthermore, the hysteresis of zinc oxide-vulcanized materials made from my new adducts usually is lower even at room temperature than the hysteresis of a comparable vulcanizate of a conventional adduct at the same temperature. All torsional hysteresis measurements given hereinafter were made by the standard method devised by Mooney and Gerke, Rubber Chem. and Tech. 14, 35 (1941). As distinguished from prior Butyl rubber-maleic anhydride adducts, the presently developed zinc oxide-cured adducts (of gum stocks as well as of carbon black compounded stocks) having the novel and distinguishing property of showing a torsional hysteresis value which is not substantially higher than that exhibited at 20–25° C., have a valuable and outstanding usefulness.

My use of the term "low hysteresis" means a hysteresis of less than 0.40. Butyl rubber, vulcanized conventionally by sulfur or quinone dioxime, and conventional Butyl:maleic anhydride adducts, vulcanized with a metallic oxide, almost always have a torsional hysteresis which is higher than 0.40. My fully vulcanized adducts almost always have a torsional hysteresis which is lower than 0.40. In fact, even when the stock contains much carbon black the hysteresis usually is much less than 0.40; it usually is about 0.25, and can be as low as about 0.10. The hysteresis of vulcanized gum stocks prepared from my new adducts is extraordinarily low; i. e., about 0.03 to 0.05. Such low hysteresis is an exceedingly valuable property in a product which is subjected to repeated flexing in use.

My use of the term "substantially as low as 138° C. as at room temperature" means that the hysteresis of any particular stock at 138° C. is not more than 0.075 higher than that of the same stock at room temperature. Usually the hysteresis of my new vulcanized products at 138° C. actually is lower than that at room temperature.

My adducts can be vulcanized with zinc oxide, magnesium oxide, or other polyvalent-metal oxides, or equivalently the hydroxides or carbonates, of any of the elements of group II of the periodic table. The amount of such vulcanizing agents used is generally about 3–12% of the weight of adduct. Examples of useful products comprised of such vulcanizates are tires, hot water bottles and steam hose.

Fillers, pigments, blowing agents and other conventional rubber compounding agents may be added to the adducts before vulcanization. The most important filler is carbon black. Any of the various types of black conventionally used in Butyl rubber is operable. The black may be put into the Banbury with the Butyl rubber, maleic anhydride and accelerator before the adduct is formed, or it may be mixed into the pre-formed adduct on a roll mill or in a Banbury.

The following examples illustrate my invention. All parts are by weight.

*Example 1*

A masterbatch of GRI-15 and carbon black was mixed in the proportion 100:50. Each test stock was then made by mixing a portion of the masterbatch with maleic anhydride at a temperature below 100° C. in a Banbury for three minutes. Then Dactin was added (except to mix A) and the temperature of the mix was raised as rapidly as possible to 177° C. by running the Banbury at its maximum speed. During this temperature rise, which took about five minutes in the particular Banbury used, the Dactin became thoroughly mixed in. The temperature was held at 177° C., by suitably adjusting the Banbury speed, for thirty minutes. During this time the reaction between the Butyl rubber and the maleic anhydride took place. The stock then was dropped from the Banbury and allowed to cool, and the Mooney viscosity (ML-4 at 100° C.) was determined. Then the cooled stock was mixed with 10 parts of Kadox brand zinc oxide on a roll mill. The stock was vulcanized in a mold under pressure for 60 minutes at 153° C. The stock finally was tested, with the results shown below. Stock A, which is contrasted with those (B–F) which illustrate my invention, was processed and tested like the others except that it contained no accelerator.

| Stock | A | B | C | D | E | F |
| --- | --- | --- | --- | --- | --- | --- |
| Masterbatch | 150 | 150 | 150 | 150 | 150 | 150 |
| Maleic anhydride | 10 | 10 | 10 | 10 | 10 | 10 |
| Dactin | | 2 | 4 | 6 | 8 | 10 |
| Mooney viscosity | 72 | 65 | 58 | 58 | 50 | 28 |
| Tensile strength (p. s. i.) | 80 | 875 | 1,480 | 1,250 | 2,120 | 1,570 |
| Elongation (percent) | 1,200 | 490 | 340 | 310 | 250 | 210 |
| 200% Modulus (p. s. i.) | 60 | 300 | 880 | 770 | 1,600 | 1,180 |
| Torsional hysteresis: | | | | | | |
| at 20° C | .526a | .329 | .219 | .285 | .146 | .293 |
| at 138° C | too plastica | .338 | .215 | .279 | .124 | .248 | a Torsional hysteresis values up to 0.60 can be measured. Materials which are only partially elastic, and to a considerable extent are plastic, have a high hysteresis, in the neighborhood of 0.50–0.60. Materials which are still more plastic, and conversely still less elastic, exhibit such plastic flow that the hysteresis cannot be measured on the apparatus used in making all of these tests.

This example shows several important features of my invention. (1) Stock A, made without Dactin, shows little or no evidence of vulcanization. This indicates that little or no maleic anhydride has combined with the rubber. (2) As little as two parts of Dactin has effected a remarkable increase in the rate of reaction between maleic anhydride and Butyl rubber. Stock B is adequately vulcanized, showing that a substantial amount of maleic anhydride has reacted with the rubber. (3) Larger amounts of Dactin, up to about 8 parts, further accelerate the rate of adduct formation. This is shown by the fact that the modulus of stocks B–E gradually rises to a maximum as the amount of Dactin is raised from two to eight parts. (4) Ten parts of Dactin is more than the optimum amount. It should be noted that stock F became very plastic during the Banbury milling, as shown by the low Mooney. The properties of the vulcanized stock F also are not as good as those of stock E.

Example 2

This example shows the effect of varying the amount of maleic anhydride in the feed. The stocks otherwise were made, vulcanized and tested as in Example I except that the proportion of Dactin was held constant.

| Stock | G | H | I | C¹ | J | K |
|---|---|---|---|---|---|---|
| Masterbatch | 150 | 150 | 150 | 150 | 150 | 150 |
| Maleic anhydride | | 3 | 5 | 10 | 15 | 20 |
| Dactin | 4 | 4 | 4 | 4 | 4 | 4 |
| Mooney viscosity | 64 | 59 | 59 | 58 | 57 | 54 |
| Tensile strength (p. s. i.) | 75 | 1,990 | 1,890 | 1,480 | 1,600 | 1,530 |
| Elongation (percent) | >1,000 | 430 | 420 | 340 | 430 | 400 |
| 200% Modulus (p. s. i.) | 50 | 860 | 860 | 880 | 770 | 800 |
| Torsional hysteresis: | | | | | | |
| At 20° C | too plastic | .176 | .186 | .219 | .257 | .234 |
| At 138° C | too plastic | .148 | .166 | .215 | .256 | .124 |

¹ From Example 1.

It is evident that the feed ratio of maleic anhydride can be varied widely without markedly affecting the properties of the adducts or their vulcanizates. The virtual lack of change of the modulus is especially important because it shows that substantially the same amount of maleic anhydride has combined with the Butyl rubber regardless of the amount in the feed. Stocks G and A, which do not illustrate my invention, show that both maleic anhydride and the accelerator must be used in my process.

Example 3

This example shows the effect of varying the length of time of masticating the stock in the Banbury at 177° C.; i. e., the period during which the adduct is formed. All other compounding, processing, vulcanizing and testing conditions were like those for stock C, Example 1.

| Stock | L | M | C |
|---|---|---|---|
| Reaction time at 177° C. (min.) | 10 | 20 | 30 |
| Mooney viscosity | 58 | 62 | 58 |
| Tensile strength (p. s. i.) | 910 | 1,070 | 1,480 |
| Elongation (percent) | 350 | 420 | 340 |
| 200% Modulus (p. s. i.) | 580 | 590 | 880 |
| Torsional hysteresis: | | | |
| at 20° C | .341 | .274 | .219 |
| at 138° C | .375 | .311 | .215 |

It is apparent that a reaction time as short as ten minutes at 177° C. is sufficient to effect considerable reaction between the maleic anhydride and the Butyl. However, a somewhat longer time improves the modulus and hysteresis of the vulcanizates. All of these stocks are sufficiently vulcanized to be commercially valuable.

Example 4

This example shows that the temperature at which the adduct is formed can be varied. These stocks were made, vulcanized and tested like stock C, Example 1, except for the temperature at which the mix was held in the Banbury.

| Stock | N | O | C |
|---|---|---|---|
| Reaction Temp. (° C.) | 149 | 163 | 177 |
| Mooney viscosity | 60 | 60 | 58 |
| Tensile strength (p. s. i.) | 570 | 1,180 | 1,480 |
| Elongation (percent) | 320 | 460 | 340 |
| 200% Modulus (p. s. i.) | 430 | 580 | 880 |
| Torsional hysteresis: | | | |
| at 20° C | .400 | .299 | .219 |
| at 138° C | .455 | .352 | .215 |

Evidently, the adduct can be formed at a temperature at least as low as 149° C. in a reasonable length of time. However, as is to be expected, at so low a temperature, the reaction between the anhydride and the rubber was not complete within thirty minutes. Nevertheless, even under such mild conditions enough maleic anhydride combined to form a moderately good vulcanizate. This is shown by the modulus.

Example 5

This example shows the use of other N-halogeno compounds to accelerate the formation of adducts according to my invention. These stocks were made, vulcanized and tested as shown in Example 1, except as shown below, and except that the reaction time at 177° C. in the Banbury was 20 minutes.

| Stock | P | Q | R | S |
|---|---|---|---|---|
| Masterbatch (Ex. 1) | 150 | 150 | 150 | 150 |
| Maleic anhydride | 5 | 5 | 5 | 4 |
| N-Bromosuccinimide | 9 | | | |
| N-Chlorosuccinimide | | 6.6 | | |
| Dichloramine T | | | 6 | |
| 3-Bromo-5,5-dimethylhydantoin | | | | 6 |
| Tensile strength (p. s. i.) | 1,770 | 2,200 | 1,160 | 1,590 |
| Elongation (percent) | 250 | 320 | 340 | 410 |
| 300% Modulus (p. s. i.) | ᵃ1,850 | 2,100 | 930 | 1,050 |
| Torsional hysteresis: | | | | |
| at 20° C | .099 | .115 | .283 | .330 |
| at 138° C | .142 | .115 | .352 | .310 |

ᵃ By extrapolation.

Example 6

This example shows that valuable gum stocks (carbon black absent) can be made by my process. Each of these adducts was made by mixing Butyl rubber and maleic anhydride in a Banbury for a few minutes at relatively low temperature. Then the Dactin was added, and the temperature was raised as rapidly as possible to 149–163° C., and held there for the time shown to form the adduct. The stock then was dropped out of the Banbury, and vulcanized and tested as shown in Example 1.

| Stock | T | U | V | W | X | Y | Z |
|---|---|---|---|---|---|---|---|
| GRI-15 | 100 | 100 | 100 | 100 | 100 | 100 | 100 |
| Maleic anhydride | 20 | 10 | 10 | 10 | 10 | 10 | 15 |
| Dactin | 3 | 3 | 3 | 3 | 5 | 4 | 7 |
| Reaction time (min.) | 30 | 30 | 20 | 10 | 20 | 20 | 20 |
| Banbury temp. (° C.) | 163 | 163 | 163 | 163 | 149 | 152 | 157 |
| Mooney viscosity | 20 | 37 | 35 | 35 | 14 | 24 | 10 |
| Tensile strength (p. s. i.) | 1,000 | 1,150 | 1,060 | 1,010 | 910 | 1,000 | 1,170 |
| Elongation (percent) | 310 | 320 | 330 | 390 | 300 | 240 | 310 |
| 200% Modulus (p. s. i.) | 700 | 800 | 660 | 430 | 580 | 880 | 750 |
| Torsional hysteresis: | | | | | | | |
| at 20° C | .077 | .050 | .046 | .059 | .070 | .039 | .054 |
| at 138° C | .052 | .050 | .058 | .047 | .066 | .038 | .061 |

Other compounds which similarly accelerate the formation of the adducts are 1,3-dibromo-5,5-dimethylhydantoin and 3-chloro-5,5-dimethylhydantoin.

Having thus described my invention, what I claim and desire to protect by letters Patent is:

1. In a method which comprises reacting, at a temperature in the range from about 135° C. to about 200° C., an elastomeric copolymer of a major proportion of isobutylene and a minor proportion of a diolefin copolymerizable therewith, with maleic anhydride, the improvement which consists of carrying out the reaction in the presence of about 1 to 10 parts by weight, based on the copolymer, of a compound selected from the class consisting of N-halogenoamides and N-halogenoimides wherein the halogen is selected from the group consisting of chlorine, and bromine.

2. In a method which comprises reacting, at a temperature in the range from about 135° C. to about 200° C., an elastomeric copolymer of a major proportion of isobutylene and a minor proportion of a diolefin copolymerizable therewith, with maleic anhydride, the improvement which consists of carrying out the reaction in the presence of about 1 to 10 parts by weight, based on the copolymer, of 1,3-dichloro-5,5-dimethylhydantoin.

3. In a method which comprises reacting, at a temperature in the range from about 135° C. to about 200° C., an elastomeric copolymer of a major proportion of isobutylene and a minor proportion of a diolefin copolymerizable therewith, with maleic anhydride, the improvement which consists of carrying out the reaction in the presence of about 1 to 10 parts by weight, based on the copolymer, of N-chlorosuccinimide.

4. In a method which comprises reacting, at a temperature in the range from about 135° C. to about 200° C., an elastomeric copolymer of a major proportion of isobutylene and a minor proportion of a diolefin copolymerizable therewith, with maleic anhydride, the improvement which consists of carrying out the reaction in the presence of about 1 to 10 parts by weight, based on the copolymer, of 1,3-dibromo-5,5-dimethylhydantoin.

5. In a method which comprises reacting, at a temperature in the range from about 135° C. to about 200° C., an elastomeric copolymer of a major proportion of isobutylene and a minor proportion of a diolefin copolymerizable therewith, with maleic anhydride, the improvement which consists of carrying out the reaction in the presence of about 1 to 10 parts by weight, based on the copolymer, of 3-chloro-5,5-dimethylhydantoin.

6. In a method which comprises reacting, at a temperature in the range from about 135° C. to about 200° C., an elastomeric copolymer of a major proportion of isobutylene and a minor proportion of a diolefin copolymerizable therewith, with maleic anhydride, the improvement which consists of carrying out the reaction in the presence of about 1 to 10 parts by weight, based on the copolymer, of 3-bromo-5,5-dimethylhydantoin.

7. A rubbery, metal-oxide-cured adduct, which adduct is made by the process of claim 1, from 3–10 parts by weight of maleic anhydride and 100 parts by weight of an elastomeric copolymer of a major proportion of isobutylene with a minor proportion of a diolefin, which cured adduct exhibits torsional hysteresis values less than 0.40 at 138° C. and not substantially higher than 0.40 at 20–25° C.

8. An unvulcanized, rubbery adduct of from 3–10 parts by weight of maelic anhydride and 100 parts by weight of an elastomeric copolymer of a major proportion of isobutylene with a minor proportion of a diolefin, which adduct is made by the process of claim 1, and characterized in having the properties when cured with 3–12% by weight of zinc oxide, based on the adduct, of being a rubbery material having torsional hysteresis values less than 0.40 at 138° C. and not substantially higher than 0.40 at 20–25 C.

References Cited in the file of this patent

UNITED STATES PATENTS

| | | |
|---|---|---|
| 2,142,980 | Huijser | Jan. 3, 1939 |
| 2,275,951 | Farmer | Mar. 10, 1942 |
| 2,634,256 | Sparks | Apr. 7, 1953 |